US010482224B2

(12) United States Patent
Wu

(10) Patent No.: US 10,482,224 B2
(45) Date of Patent: Nov. 19, 2019

(54) METHOD FOR GENERATING A SIGNED ELECTRONIC DOCUMENT WITH AN ANTI-TAMPER FUNCTION

(71) Applicant: Thinkcloud Digital Technology Co., Ltd., Taichung (TW)

(72) Inventor: Yu-Jen Wu, Taichung (TW)

(73) Assignee: THINKCLOUD DIGITAL TECHNOLOGY CO., LTD., Taichung (TW)

( * ) Notice: Subject to any disclaimer, the term of this patent is extended or adjusted under 35 U.S.C. 154(b) by 149 days.

(21) Appl. No.: 15/724,752

(22) Filed: Oct. 4, 2017

(65) Prior Publication Data

US 2018/0107818 A1 Apr. 19, 2018

(30) Foreign Application Priority Data

Oct. 14, 2016 (TW) .............................. 105133201 A

(51) Int. Cl.
| | | |
|---|---|---|
| *G06F 21/31* | (2013.01) | |
| *G06F 3/0488* | (2013.01) | |
| *G06F 17/24* | (2006.01) | |
| *G06F 21/36* | (2013.01) | |
| *H04L 29/06* | (2006.01) | |
| *G06F 21/64* | (2013.01) | |

(52) U.S. Cl.
CPC .......... *G06F 21/31* (2013.01); *G06F 3/04883* (2013.01); *G06F 17/242* (2013.01); *G06F 17/243* (2013.01); *G06F 21/36* (2013.01); *G06F 21/64* (2013.01); *H04L 63/107* (2013.01); *G06F 17/241* (2013.01)

(58) Field of Classification Search
CPC ........ G06F 21/36; G06F 21/64; G06F 17/242; G06F 17/241; G06F 17/243; G06F 3/04883; G06F 21/31; H04L 63/107
See application file for complete search history.

(56) References Cited

U.S. PATENT DOCUMENTS

| | | | | |
|---|---|---|---|---|
| 2011/0138445 A1* | 6/2011 | Chasen | ................... | G06F 21/10 726/3 |
| 2011/0231666 A1* | 9/2011 | Guenther | ................ | G06F 21/32 713/186 |
| 2012/0284602 A1* | 11/2012 | Seed | ................... | G06Q 20/3274 715/224 |
| 2013/0238966 A1* | 9/2013 | Barrus | ............... | G06K 9/00449 715/223 |
| 2013/0332296 A1* | 12/2013 | Murray, Jr. | ........ | G06Q 30/0605 705/26.1 |

(Continued)

*Primary Examiner* — Cheng-Feng Huang
(74) *Attorney, Agent, or Firm* — Birch, Stewart, Kolasch & Birch, LLP

(57) ABSTRACT

A method is to be implemented by a network server, and includes: receiving input information associated with a handwritten signature inputted on an original document, and a dynamic image associated with a motion of a signer during input of the handwritten signature; compiling a signed document based on the original document, the input information and the dynamic image; generating an authentication value based on a location where the handwritten signature is rendered on the signed document and a location where the dynamic image is rendered on the signed document; and incorporating the authentication value into the signed document to result in an anti-tamper document.

8 Claims, 5 Drawing Sheets

(56) References Cited

U.S. PATENT DOCUMENTS

| | | | |
|---|---|---|---|
| 2014/0130177 A1* | 5/2014 | Gregoire | G06F 21/32 |
| | | | 726/26 |
| 2015/0012812 A1* | 1/2015 | Wu | G06F 17/2247 |
| | | | 715/234 |
| 2016/0219036 A1* | 7/2016 | Devkar | H04L 63/20 |
| 2016/0283777 A1* | 9/2016 | Holden | G06K 9/00154 |

* cited by examiner

METHOD FOR GENERATING A SIGNED ELECTRONIC DOCUMENT WITH AN ANTI-TAMPER FUNCTION

CROSS-REFERENCE TO RELATED APPLICATION

This application claims priority of Taiwanese Invention Patent Application No. 105133201, filed on Oct. 14, 2016.

FIELD

The disclosure relates to a method for generating a signed electronic document, and more particularly to a method for generating a signed electronic document with an anti-tamper function.

BACKGROUND

A conventional method for generating an electronic signature is disclosed in U.S. Patent Application Publication No. 2015012812. The conventional method includes receiving a representative signal of handwritten signature inputted by a signer and a dynamic image that presents a motion of the signer during signing of the handwritten signature captured by a dynamic image capturing module as the handwritten signature is being inputted, and compiling a data file that includes the representative signal and the dynamic image to be used in subsequent verification of whether the resultant electronic signature is actually made by the genuine signer. However, the electronic signature generated by the conventional method can only be used to verify the authenticity of a signature, and cannot prevent a situation where an electronic document embedded with the conventional electronic signature is tampered with in a manner that only content therein, for example a check mark of a checkbox, is altered while the electronic signature remains untouched.

SUMMARY

Therefore, an object of the disclosure is to provide a method for generating a signed electronic document with an anti-tamper function that can alleviate at least one of the drawbacks of the prior art.

According to the disclosure, the method is to be implemented by a network server communicable with an electronic device. The electronic device includes a touch screen and an image capturing module. The electronic device executes an application program to load an original document and to display the original document on the touch screen. The method includes:

receiving, by the network server from the electronic device, input information that is associated with a handwritten signature inputted by a signer via the touch screen, and a dynamic image that is captured by the image capturing module and that is associated with a motion of the signer during input of the handwritten signature;

compiling, by the network server, a signed document based on the original document, the input information and the dynamic image;

generating, by the network server, an authentication value based on a location where the handwritten signature is rendered on the signed document and a location where the dynamic image is rendered on the signed document; and incorporating, by the network server, the authentication value into the signed document to result in an anti-tamper document.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
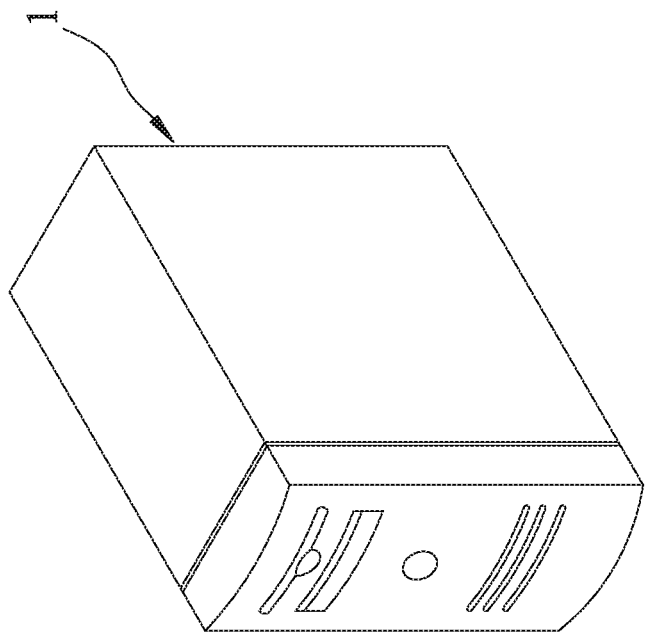
FIG. 1 is a schematic diagram illustrating an embodiment of a network server that is communicable with at least one electronic device and that implements a method for generating a signed electronic document with an anti-tamper function according to the disclosure.
Figure 1:
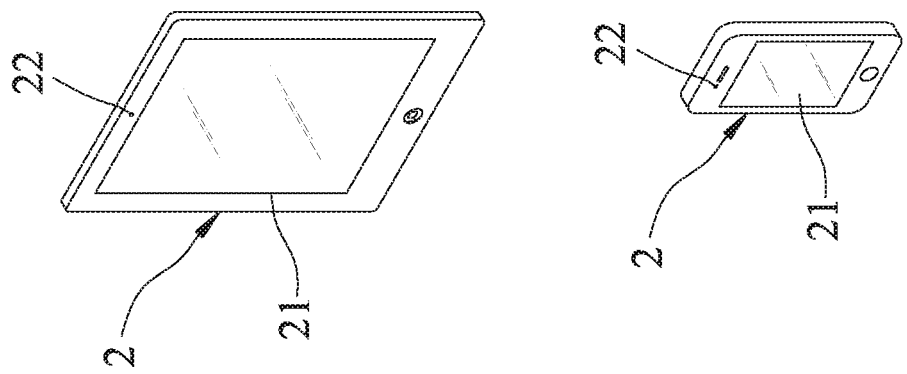
Figure 2:
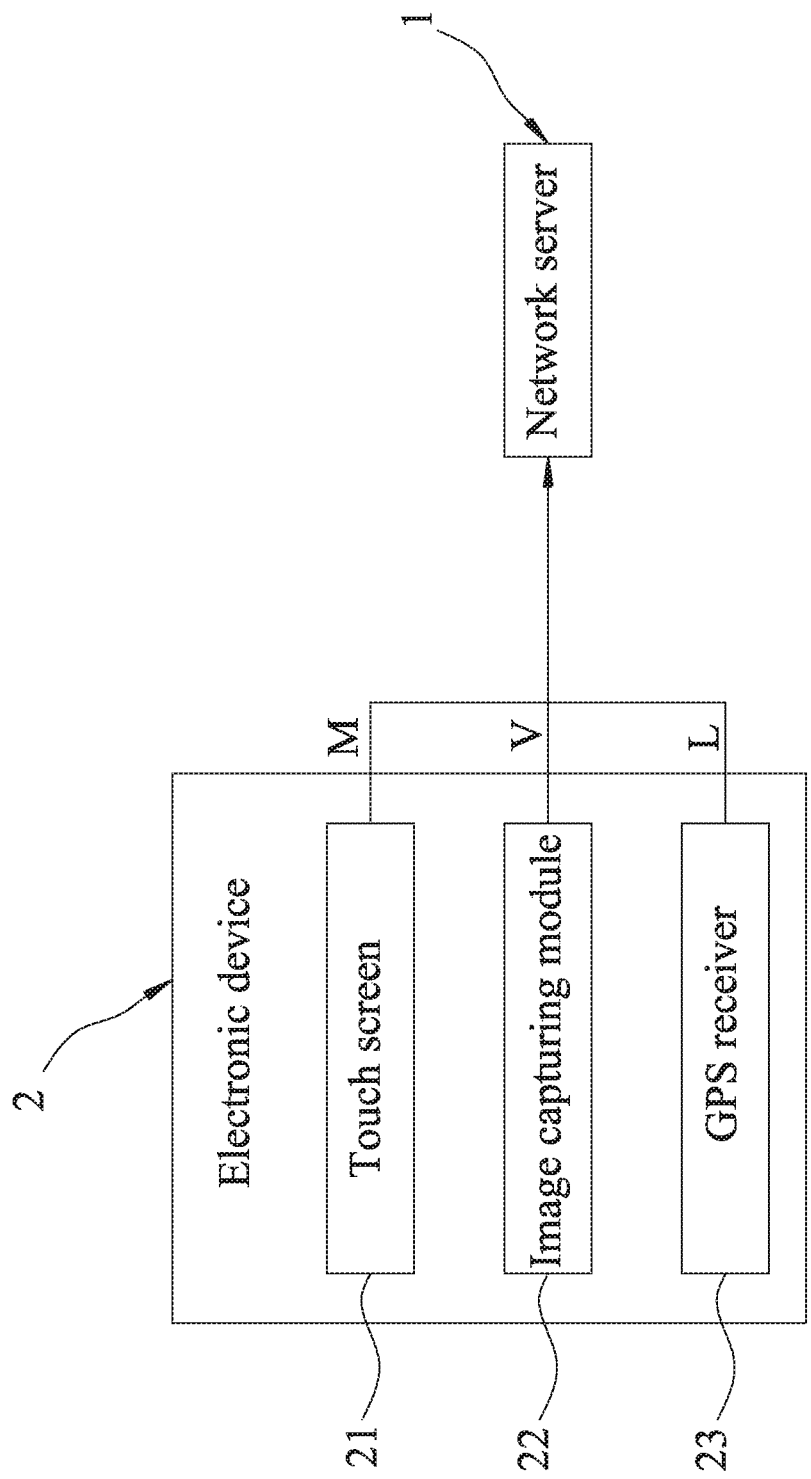
FIG. 2 is a block diagram illustrating the embodiment of the network server that is communicable with an electronic device.

FIGS. 1 and 2 illustrate an embodiment of a network server 1 that is communicable with an electronic device 2 and that is utilized to implement a method for generating a signed electronic document with an anti-tamper function according to this disclosure. The electronic device 2 may be implemented by a personal computer (PC), a personal digital assistant (PDA), a smartphone, or the like, but is not limited thereto.

The electronic device 2 includes a touch screen 21, an image capturing module 22 to face a user of the electronic device 2 (e.g., a signer), a Global Positioning System (GPS) receiver 23, and a microphone (not shown). In this embodiment, the image capturing module 22 is implemented by a camera, but implementation thereof is not limited thereto. The GPS receiver 23 is adapted to receive a GPS signal and to calculate a coordinate set (L) of a position of the electronic device 2. The coordinate set (L) may for example include a latitude coordinate and a longitude coordinate.

Referring to FIGS. 1 to 5, an embodiment of the method for generating the signed electronic document with the anti-tamper function according to this disclosure is illustrated. The method includes steps S31 to S37 shown in FIG. 4.

Figure 3:
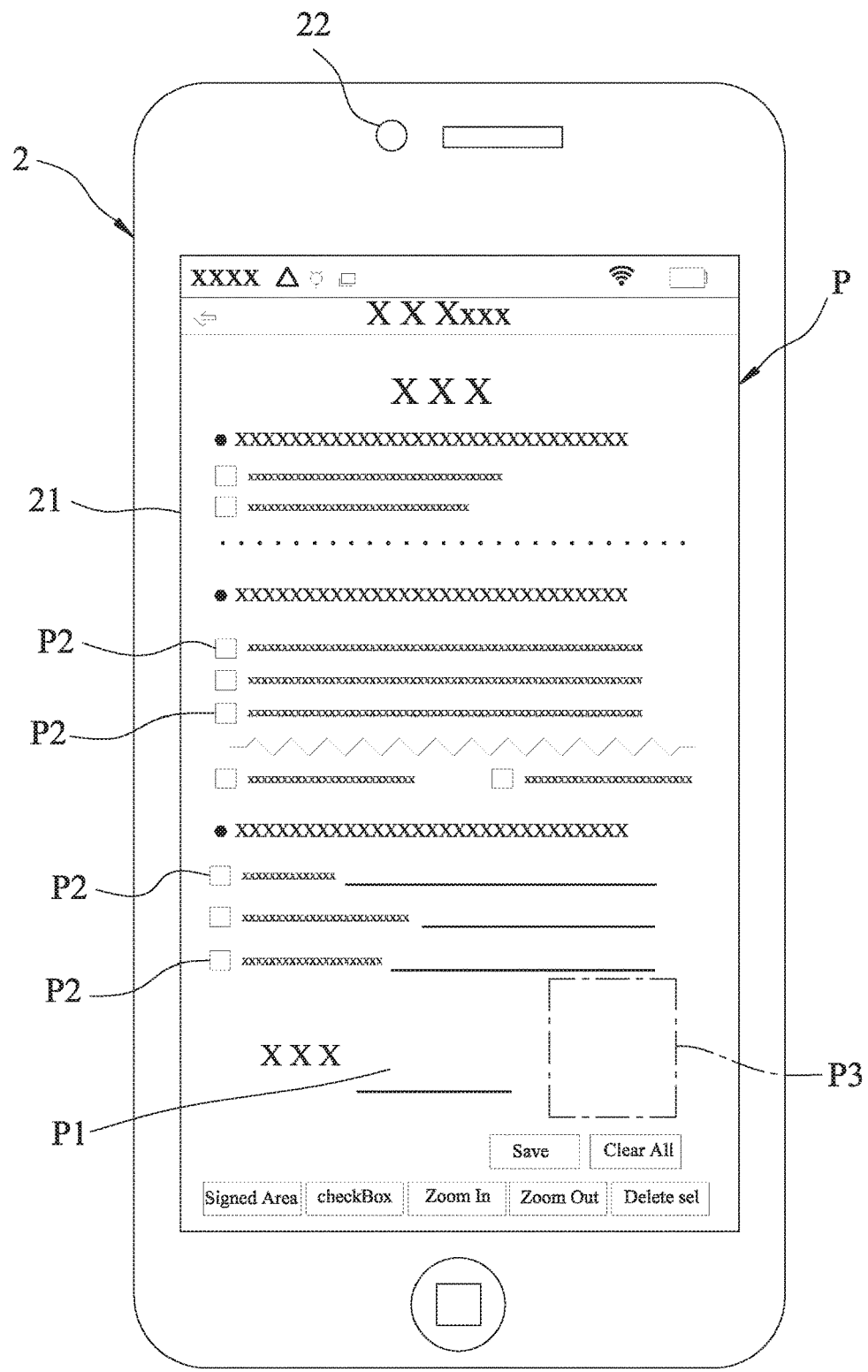
FIG. 3 is a schematic view illustrating an embodiment of an original document displayed on a touch screen according to this disclosure.
Figure 4:
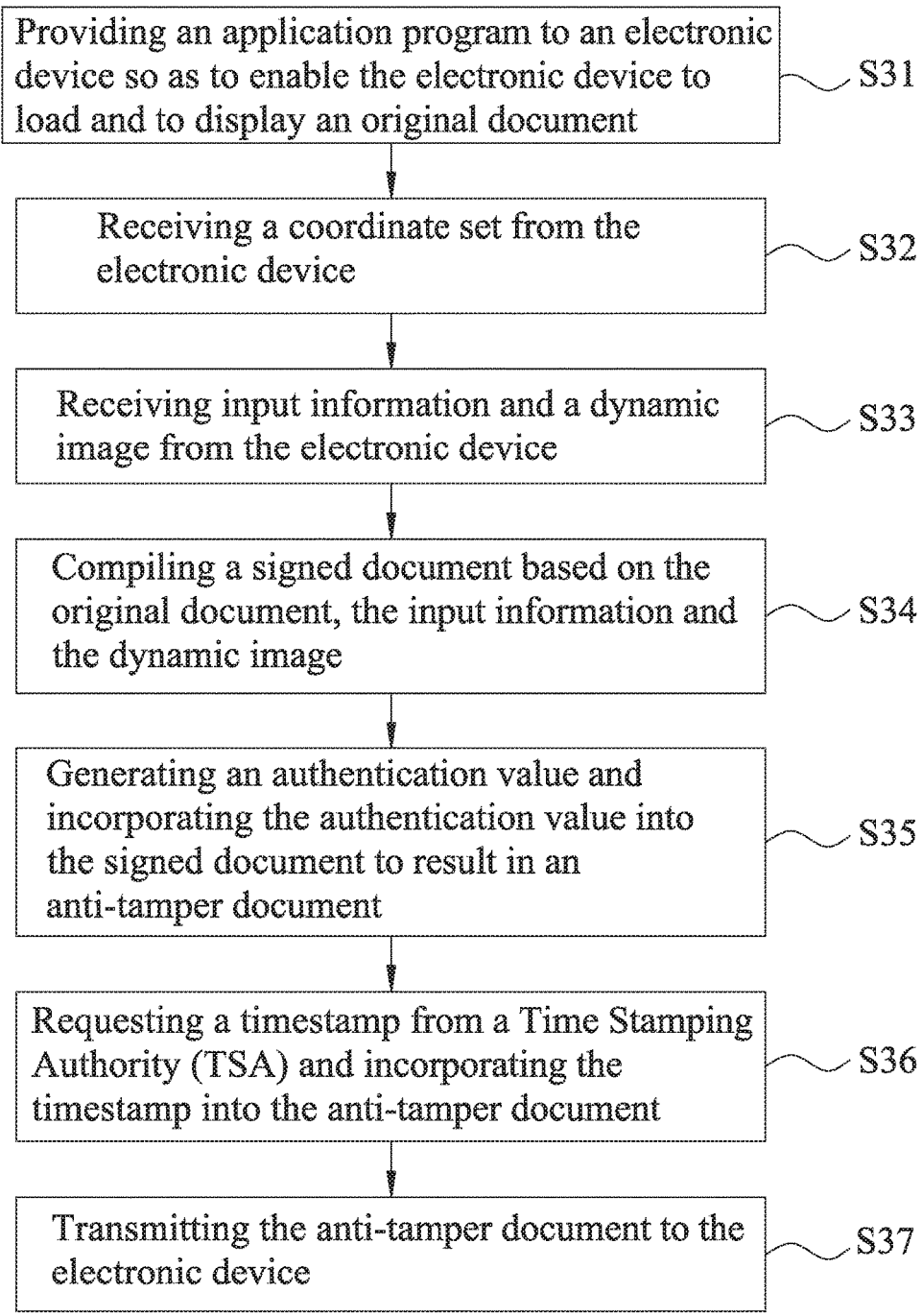
FIG. 4 is a flow chart illustrating an embodiment of the method for generating a signed electronic document with an anti-tamper function according to this disclosure.

In step S31, the network server 1 provides an application program to the electronic device 2 for installation of the application program on the electronic device 2. The electronic device 2 executes the application program to load an original document (P) and to display the original document (P) on the touch screen 21. In this embodiment, the original document (P) includes a signature area (P1), at least one checkbox (P2) and a predetermined area (P3) as shown in FIG. 3.

In step S32, the network server 1 receives from the electronic device 2 the coordinate set (L) calculated by the GPS receiver 23 based on the GPS signal.

In step S33, the network server 1 receives, from the electronic device 2, input information (M) that includes information of a handwritten signature 41 inputted in the signature area (P1) by the signer via the touch screen 21 and one or more check marks 42 inputted in said at least one checkbox (P2) via the touch screen 21, and a dynamic image (V) that is captured by the image capturing module 22 and that is associated with a motion of the signer, such as facial expression and/or movement of a signing hand of the signer, during input of the handwritten signature 41. In addition, in one embodiment, the network server 1 also receives, from the electronic device 2, a voice signal that is inputted by the signer via the microphone of the electronic device 2 and that is associated with a record of the signer's voice during input of the handwritten signature 41.

In this embodiment, the handwritten signature 41 and the check mark(s) 42 are described by a markup language (such as an extensible markup language, XML). In one embodiment, the handwritten signature 41 may be implemented by scalable vector graphics (SVG) containing XML syntax. Specifically speaking, the input information (M) may be implemented by records of coordinates of positions on the touch screen 21 corresponding to successive touch events on the touch screen 21 that are associated with input of the handwritten signature and the check mark(s) 42 by the signer on the touch screen 21 and that cooperatively constitute a movement of the signing action performed by the signer. In this embodiment, the dynamic image (V) is implemented by streaming media and stored in a format supporting at least one of standards, such as Flash Video (with a filename extension .flv or .f4v), H.263, H.264 (with a filename extension .mp4), RealMedia (with a filename extension .rm), Windows Media Video (with a filename extension .wmv), MPEG-4 (with a filename extension .m4v), QuickTime File Format (with a filename extension .mov), and the like, but is not limited thereto.

Figure 5:
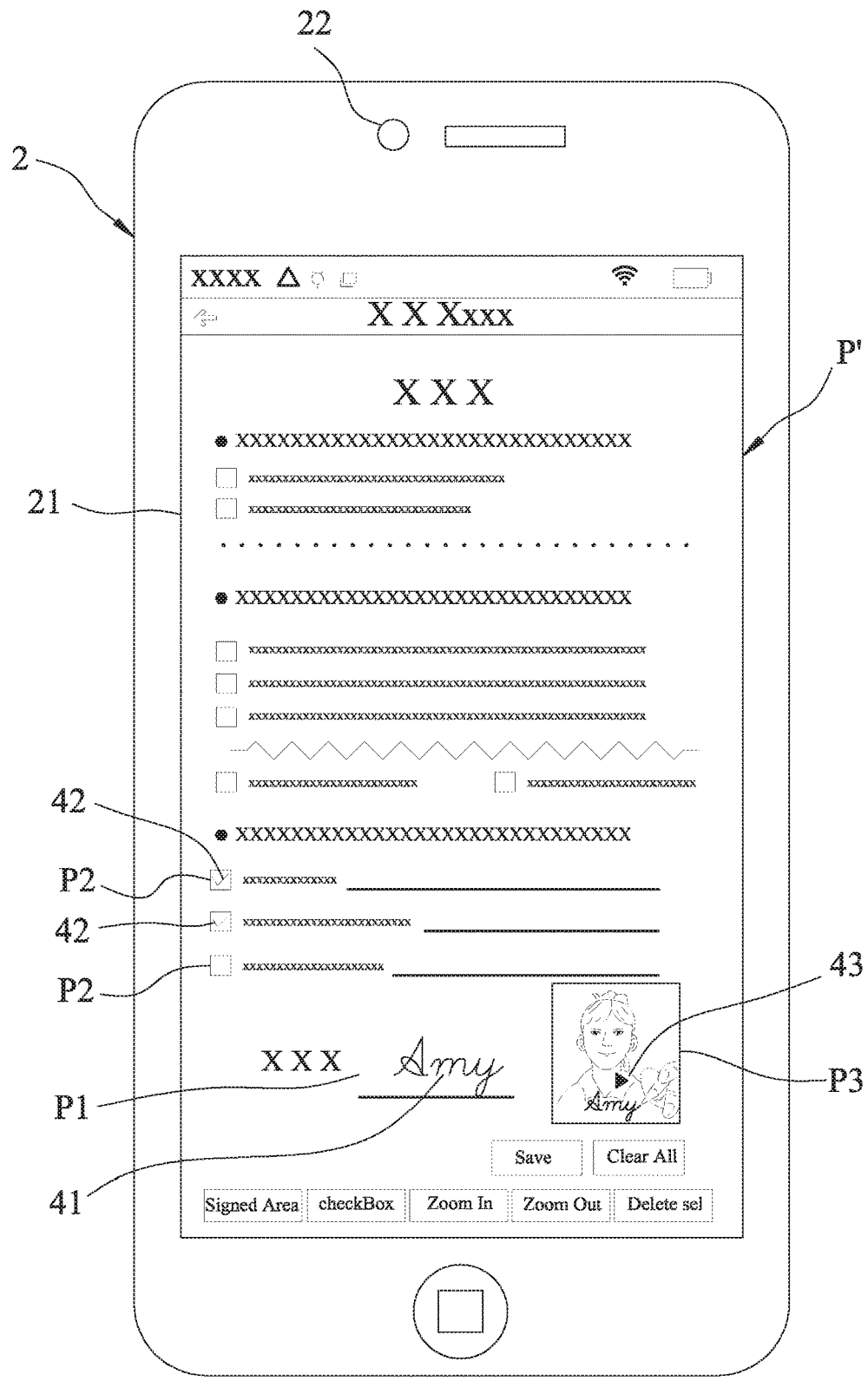
FIG. 5 is a schematic view illustrating an embodiment of a signed document displayed on the touch screen according to this disclosure.

In step S34, the network server 1 compiles a signed document (P') as shown in FIG. 5 based on the original document (P), the input information (M), the dynamic image (V) and the voice signal, such that the signed document (P') includes contents of the original document (P) with a reproduction of the handwritten signature 41 presented in the signature area (P1) of the signed document (P'), and a reproduction of the check mark(s) 42 presented on said at least one checkbox (P2) thereof. Moreover, the network server 1 embeds the dynamic image (V), which is overlaid with another reproduction of the handwritten signature (41) of the input information (M), in the predetermined area (P3) of the signed document (P').

In step S35, the network server 1 generates an authentication value based on the coordinate set (L), a location where the handwritten signature 41 is rendered on the signed document (P') (i.e., the signature area (P1) in this embodiment), a location where the dynamic image (V) is rendered on the signed document (P') (i.e., the predetermined area (P3) in this embodiment), and a location of each check mark 42 on said at least one checkbox (P2) of the signed document (P'). Thereafter, the network server 1 incorporates the authentication value into the signed document (P') to result in an anti-tamper document. In this embodiment, the authentication value is implemented to be a Hash value calculated by irreversible Hashing algorithms, but implementation of the authentication value is not limited thereto. Therefore, the authentication value may vary when at least one of the coordinate set (L), the location where the handwritten signature 41 is rendered on the signed document (P'), the location where the dynamic image (V) is rendered on the signed document (P'), or the location of each check mark 42 on said at least one checkbox (P2) is altered.

In step S36, the network server 1 requests a timestamp from a Time Stamping Authority (TSA) and incorporates the timestamp obtained from the ISA into the anti-tamper document. As a result, creation of the anti-tamper document at a specific time point can be verified by the ISA based on the timestamp incorporated in the anti-tamper document. Therefore, once the time the anti-tamper document was last modified does not correspond to the timestamp, it can be determined that the contents in the anti-tamper document may have been altered.

In step S37, the network server 1 transmits the anti-tamper document to the electronic device 2 to enable the electronic device 2 to display, via the touch screen 21, the anti-tamper document which includes the handwritten signature 41, the check mark 42 and the dynamic image (V).

It should be noted that the order of execution of steps S35 and S36 can be exchanged. That is to say, the network server 1 may first request the timestamp from the TSA, and then incorporate the timestamp obtained from the TSA into the signed document (P'), followed by generating the authentication value and incorporating the authentication value into the signed document (P') which has been incorporated with the timestamp so as to result in the anti-tamper document (P'''). Since implementation of authentication of an electronic document by the authentication value is well known to one skilled in the relevant art, detailed explanation of the same is omitted herein for the sake of brevity.

In other embodiments, if no check mark is inputted in said at least one checkbox (P2) by the signer, the authentication value contained in the anti-tamper document will not be associated with any check mark. In this way, if the anti-tamper document is tampered with by adding a check mark 42 into said at least one checkbox (P2), the authentication value may serve the purpose of verifying that the content of the anti-tamper document has been altered.

In summary, the method of this disclosure includes embedding the dynamic image (V) overlaid with the reproduction of the handwritten signature 41 in the signed document (P'), and generating the authentication value based on the coordinate set (L), the location where the handwritten signature 41 is rendered on the signed document (P'), the location where the dynamic image (V) is rendered on the signed document (P'), and the location of each check mark 42 on said at least one checkbox (P2), so as to realize the functions of authentication and anti-tampering. Moreover, the method of this disclosure includes incorporating the timestamp obtained from the TSA into the anti-tamper document (P'''), so as to facilitate verification of the time when the anti-tamper document is created. In this way, the anti-tamper function may be further improved.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A method for generating a signed electronic document with an anti-tamper function, the method to be implemented by a network server communicable with an electronic device, the electronic device including a touch screen and an image capturing module, the electronic device executing an application program to load an original document and to display the original document on the touch screen, said method comprising:

receiving, by the network server from the electronic device, input information that is associated with a handwritten signature inputted by a signer on the original document via the touch screen, and a dynamic image that is captured by the image capturing module and that is associated with a motion of the signer during input of the handwritten signature;

compiling, by the network server, a signed document based on the original document, the input information and the dynamic image;

generating, by the network server, an authentication value based on a first location where the handwritten signature is rendered on the signed document and a second location where the dynamic image is rendered on the signed document, wherein the first location is different from the second location;

incorporating, by the network server, the authentication value into the signed document to result in an anti-tamper document; and transmitting, by the network server, the anti-tamper document to the electronic device to enable the electronic device to display, via the touch screen, the anti-tamper document which contains the handwritten signature and the dynamic image presented thereon.

2. The method as claimed in claim 1, wherein the compiling a signed document includes requesting, by the network server, a timestamp from a Time Stamping Authority (ISA) and incorporating, the network server, the timestamp obtained from the TSA into the signed document.

3. The method as claimed in claim 1, subsequent to the incorporating the authentication value, further comprising: requesting, by the network server, a timestamp from a Time Stamp Authority (ISA) and incorporating, by the network server, the timestamp obtained from the ISA into the anti-tamper document.

4. The method as claimed in claim 1, the original document including a signature area and at least one checkbox, wherein in the receiving input information, the input information includes information of the handwritten signature inputted in the signature area and a check mark inputted on said at least one checkbox via the touch screen.

5. The method as claimed in claim 4, wherein the generating an authentication value includes generating, by the network server, the authentication value further based on a location of the check mark on said at least one checkbox.

6. The method as claimed in claim 1, wherein the compiling a signed document includes embedding, by the network server, the dynamic image, which is overlaid with a reproduction of the handwritten signature of the input information, in a predetermined area of the signed document.

7. The method as claimed in claim 1, further comprising: receiving, by the network server from the electronic device, a coordinate set of a position of the electronic device; wherein the generating an authentication value includes generating, by the network server, the authentication value further based on the coordinate set.

8. The method as claimed in claim 7, the electronic device further including a Global Positioning System (GPS) receiver that is adapted to receive a GPS signal and to calculate the coordinate set of the position of the electronic device, wherein the receiving a coordinate set includes receiving, by the network server from the electronic device, the coordinate set calculated by the GPS receiver based on the GPS signal.

* * * * *